United States Patent

Øvrebø

[11] Patent Number: 6,102,487
[45] Date of Patent: Aug. 15, 2000

[54] TEMPERATURE AND TIME CONTROL OF ELECTRICAL HEATING DEVICE

[75] Inventor: Kjell Øvrebø, Oslo, Norway

[73] Assignee: Elink AS, Bones, Norway

[21] Appl. No.: 09/202,044

[22] PCT Filed: Jun. 4, 1997

[86] PCT No.: PCT/NO97/00141

§ 371 Date: Dec. 7, 1998

§ 102(e) Date: Dec. 7, 1998

[87] PCT Pub. No.: WO97/47066

PCT Pub. Date: Dec. 11, 1997

[30] Foreign Application Priority Data

Jun. 5, 1996 [NO] Norway .................................. 8-962332

[51] Int. Cl.[7] ..................................................... H02J 1/00
[52] U.S. Cl. ............................................. 301/31; 219/475
[58] Field of Search ..................... 307/31, 39; 364/528.3, 364/492; 219/475, 476, 477, 480, 482

[56] References Cited

U.S. PATENT DOCUMENTS

| | | | |
|---|---|---|---|
| 4,389,577 | 6/1983 | Anderson et al. ......................... | 307/39 |
| 4,513,382 | 4/1985 | Faulkner .................................. | 364/492 |
| 4,589,075 | 5/1986 | Buennagel .............................. | 364/492 |
| 5,502,339 | 3/1996 | Hartig ...................................... | 307/31 |

FOREIGN PATENT DOCUMENTS

| | | |
|---|---|---|
| 0 688 085 | 7/1998 | European Pat. Off. . |
| WO 94/06191 | 3/1994 | WIPO . |
| WO 94/12945 | 6/1994 | WIPO . |

*Primary Examiner*—Fritz Fleming
*Assistant Examiner*—Robert L. DeBeradinis
*Attorney, Agent, or Firm*—Young & Thompson

[57] ABSTRACT

In a method for temperature and time control of electrical heating devices installed at an end user to optimize energy consumption and energy costs, where a dedicated control system is employed for the control, a local control unit is connected to an electrical heating device for control thereof. The end user supplies a desired user profile for the heating device to the control system which optimizes energy and power consumption on the basis of both the user profile and the operating and capacity conditions in the power supply network. The control commands are transferred to the local control unit. In addition to a dedicated control system for implementation of the method, a control and communication structure includes local control units installed at end users and one or more communication interfaces.

17 Claims, 6 Drawing Sheets

TEMPERATURE AND TIME CONTROL OF ELECTRICAL HEATING DEVICE

BACKGROUND OF THE INVENTION

The invention concerns a method for temperature and time control of electrically-operated heating devices installed at an end user in order to optimize energy consumption and energy costs, wherein the end user is connected to a power supply network, and wherein there is employed for the control a dedicated control system which forms part of a control and communication structure. The invention also concerns a control and communication structure for temperature and time control of electrically-operated heating devices installed at an end user in order to optimize energy consumption and energy costs, wherein the end user is connected to a power supply network, and wherein the control and communication structure comprises a dedicated control system and one or more communication interfaces. Finally, the invention concerns a local control unit for use in a control and communication structure for temperature and time control of electrically-operated heating devices installed at an end user in order to optimize energy consumption and energy costs, wherein the end user is connected to a power supply network, and wherein the control and communication structure comprises a dedicated control system and one or more communication interfaces, together with an application of the local control unit.

In order to achieve efficient exploitation of energy resources, it is of vital importance to be able to monitor and control the consumption of electrical energy, thus optimizing energy consumption on the basis of one or more criteria, such as minimizing energy costs or minimizing power consumption or a combination of such criteria. Methods and systems are known which perform various forms of optimization of the consumption of electrical energy. For example, systems are known which provide a local optimization of the energy consumption and a restriction of the maximum power. Where such local systems comprise a number of elements, the communication between the elements in the system is conducted by means of cable-borne communication. In such local systems it is the local user, consumer or end user who sets up the optimization criteria. EP-A-0688085 discloses an energy control system in which a central control device controls thermal units used in heating a building with reference to information relating to tariff changes so as to maintain temperature within preset bounds while resulting in minimum cost.

There are also known systems which employ different types of communication systems, such as radio communication, carrier wave communication on the power network and continuous control of energy and power consumption in a distribution network with end user loads. In systems of this kind it is the operation manager or the operator of the power supply network who sets up the optimization criteria.

The disadvantage of the known systems for optimizing the electrical energy consumption is that they either consider only the end user's requirements and not the capacity and operating conditions of the power supply system, or they show primary consideration towards the latter, but not to the end user's requirements. Moreover, systems which require frequent monitoring of the end user are based on sampling and recording of power consumption and transfer of measurements to a control centre, from where energy consumption and power consumption can be controlled according to more closely specified criteria. This is based on a two-way communication, eventually resulting in comprehensive and costly measures for conducting the communication and handling often substantial amounts of data. In order to avoid this and achieve benefits in efficiency, it has been proposed that well-defined categories of end users should be monitored, based on representative selections, resulting in a central control of power consumption based on statistical optimization parameters.

In general, it can be said that as a rule the prior art in optimization of the consumption of electrical energy requires substantial investment in components and considerable installation costs. No attempt has been made to integrate different forms of control, such as control of thermostats, control of power, energy, time control, switch functions and central communication in one and the same unit, even though this appears to be an essential condition for achieving the necessary flexibility in the optimization.

Furthermore, the known systems can entail considerable operating costs which generally have to be covered by the operating manager for the power supply network or the owners thereof.

The systems currently in use for power control in local distribution networks are controlled centrally, thus offering the end user little opportunity of influencing the system, and the end user has no opportunity whatever of influencing either his own energy consumption profile or the power supply system's total energy consumption profile.

Control concepts based on continuous control (ripple control) and carrier wave communication on the power link, employ units which are placed in fuse boxes and the like on the premises of the end user, and do not permit, e.g., control of a medium which has to be heated by electrical heating devices. In the case of local systems which provide the opportunity for temperature control, these generally comprise a number of units and communication between the units is generally conducted on a cable-borne system. These systems are usually limited to a building complex.

SUMMARY OF THE INVENTION

Thus the object of the present invention is to achieve greater flexibility in optimizing the electrical energy consumption, or alternatively to achieve a more satisfactory control of the power consumption from the point of view of both the energy supplier and the end user. A second object is that the present invention should provide an optimization which takes into account the fact that the energy market is generally deregulated, and that costs and prices are controlled by factors which in the final analysis are linked to supply and demand. Consequently, it is also the object of the present invention to provide a method and a control and communication structure which permit an optimization which not only considers isolated needs of either the power suppliers or the end users, but which can provide an optimization based on an overriding control which takes into consideration both the requirements of the end user and operating conditions in the distribution network.

It is also an object of the present invention that it should be able to employ relatively simple communication methods, while at the same time increasing the efficiency of the collection and processing of information and keeping the costs on the investment and operating sides at a low level.

In purely general terms the object of the present invention is to overcome the drawbacks which exist in the prior art. Moreover, the individual end user should specifically have the ability to control his own and influence an overriding energy consumption profile, thus contributing to the optimization of both the total energy and power consumption.

Yet another object of the present invention is that the communication which is necessary should be able to utilise generally available communication networks and methods, as well as open and generally available user interfaces to the communication systems.

In specific terms it is an object of the present invention to provide an optimization of temperature variation and temperature conditions in a medium which has to be heated up by a local, electrically-operated heating device.

The present invention provides:
i) a method for temperature and time control of electrically-operated heating devices; and
ii) a control and communications structure for temperature and time control of electrically-operated heating devices.

The above-mentioned objects maybe achieved by means of a method which is characterized in that the method comprises connecting a local control unit with at least one electrical heating device, the local control unit being arranged to control the operation of one or more electrical heating devices, formulating a desired user profile for the heating device, the user profile comprising at least one desired temperature variation with indication of a maximum permissible deviation from this desired temperature variation within specified periods, transferring the desired user profile from the end user to the control system via a first communication network, storing the desired user profile in a database provided in the control system, modifying the desired user profile in the database on the basis of information received in the control system concerning the operating conditions in the power supply network via a second communication network, thus obtaining a modified user profile which takes into consideration the operating conditions in the power supply network, including total consumption, capacity and possibly detected error conditions, since the modified user profile should at all times lie within limits which are given by the deviations in the temperature variation indicated in the desired user profile during specified periods, transferring control commands from the control system to the local control unit installed at the end user via a third communication network, and continuously modifying the control commands in the control center on the basis of the modified user profile, thus optimizing the operation of the heating device primarily on the basis of the desired user profile and secondarily on the basis of the operating conditions in the power supply network.

The above-mentioned objects and advantages may also be achieved with a control and communication structure which is characterized in that the system comprises a local control unit installed at the end user and coupled in series in an electric circuit between the power supply network and one or more heating devices, the control unit being provided in the same room, area or environment whose temperature is to be influenced by the heating device, a communication interface provided in the control unit in order to receive control commands and messages transmitted from the control system to the control unit, an interface installed at the end user for two-way communication between the end user and the control system, a data processing device, which is provided in the control system and assigned to a first communication interface for communication with a communication interface in the control unit, a second interface for two-way communication between the control system and a third interface for receipt of information concerning the operating conditions in the power supply network, and a database which is stored in the data processing device and which stores a desired user profile transferred from the end user to the control centre, and possibly modifications of the user profile performed by the data processing device, together with control commands and messages which have to be transferred to the control unit or the end user.

Finally, the invention may provide a local control unit which is characterized in that it comprises a radio communication device, a data processor connected with the radio communication device, at least one switch device which is connected with the data processor and can be influenced thereby to connect electrical energy to the heating device, and at least one temperature measuring unit connected to the data processor and arranged to measure the temperature in a medium which is to be influenced by the heating device, the intelligent control unit being arranged to be coupled in series in the electric circuit between the heating device and the power supply network.

According to the invention this control unit should be able to be employed as an intelligent thermostat device for an electrical heating device.

BRIEF DESCRIPTION OF THE DRAWINGS

The invention will now be described in more detail with reference to embodiments and in connection with the accompanying drawings.

DESCRIPTION OF THE PREFERRED EMBODIMENTS

Figure 1:
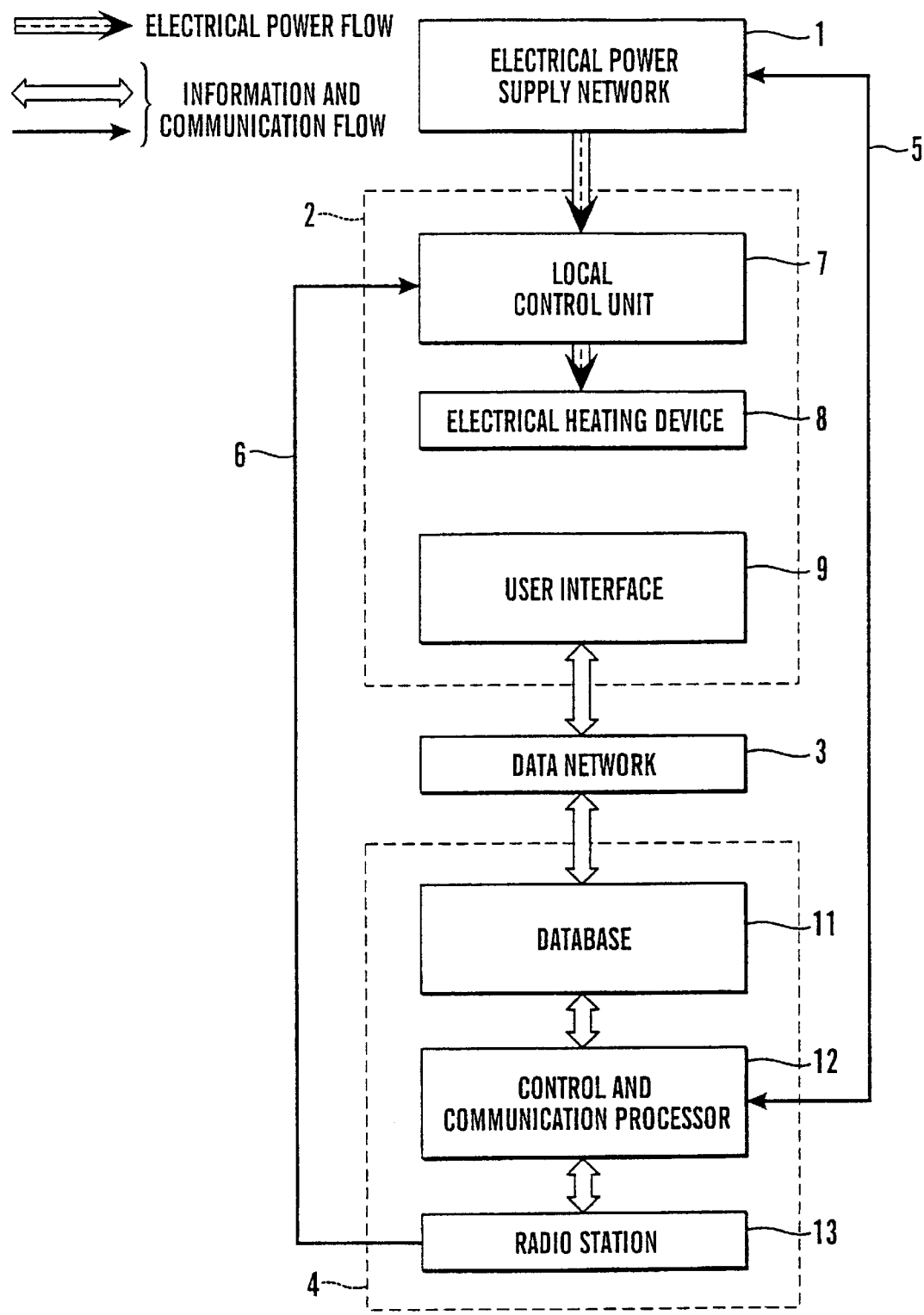
FIG. 1 illustrates a general end user survey of control and communication structures according to the present invention, as they appear in connection with an electrical power supply system.

The end user and control and communication structure which realises the invention is illustrated schematically in FIG. 1 for an end user 2 who is connected to an electrical power supply network 1. On the premises of the end user 2 a local control unit 7 is coupled in series between the power supply network 1 and an electrical heating device 8. The end user 2 also comprises a user interface 9 which is connected via a data network 3 with a control system 4. For two-way communication between the user interface 9 and the control system 4, e.g., the data network may be based on the "Internet", with the use of software in connection thereto. The electrical power supply network 1 communicates further with the control system 4 via a communication network 5. The control system 4 comprises a database 11 which stores information about the electrical power supply network 1 and user profiles which are entered from the end user 2 via the user interface 9. The database 11 is connected to a control and communication processor 12 which evaluates and processes the data which are to be employed as reference data for an optimum control of the energy consumption for the end users 2 and which is obtained from the user profile stored in the database 11. The control and communication processor 12 further processes the information concerning the operation of the electrical power supply network 1 and uses this, for example, to formulate a power profile for the end user, the power profile forming the basis for modification of the end user profile within limits established thereby.

The control and communication processor 12 in the control system 4 is also connected to a radio station 13 which transfers control commands and messages to the local control unit 7 installed at the end user 2 via a radio link 6 which is connected to a communication device 14 in the local control unit 7. The communication device may, for example, be a radio receiver. In practice the radio link 6 can be based on the use of existing mobile radio networks (mobile telephone networks). Under the control of software in the communication processor 12, control commands are now transferred with values for regulation of the electrical energy consumption for the end user 2, the communication for this purpose being performed in a 1:1 mode.

Since the system may naturally include a plurality of end users 2, it will be possible to transfer any joint control commands for a group of end users in a broadcast mode from the radio station 13.

Via the control and communication processor in the control system 12 and on one hand on the basis of the end user profiles which have been entered in the database 11, and on the other hand on the basis of information concerning operating capacity and operating conditions in the electrical energy supply network 1, the system according to the invention can, for example, in a pure forward coupling reduce the power consumption for the end user 2 during a given time interval. At the same time the control system 4 can monitor the local distribution systems on an aggregated level. An aggregated monitoring of local distribution systems can be performed by means of standard energy meters and with pulse output. The measurements may, for example, be returned to the control system 4 by means of a measuring terminal and a fixed line connection, shown here as the communication line 5. The collected, aggregated measurement data are used in an application program assigned to the control and communication processor 12, which program generates the desired control commands and control functions which simultaneously satisfy the values given by the end user in the user profile.

Figure 2:
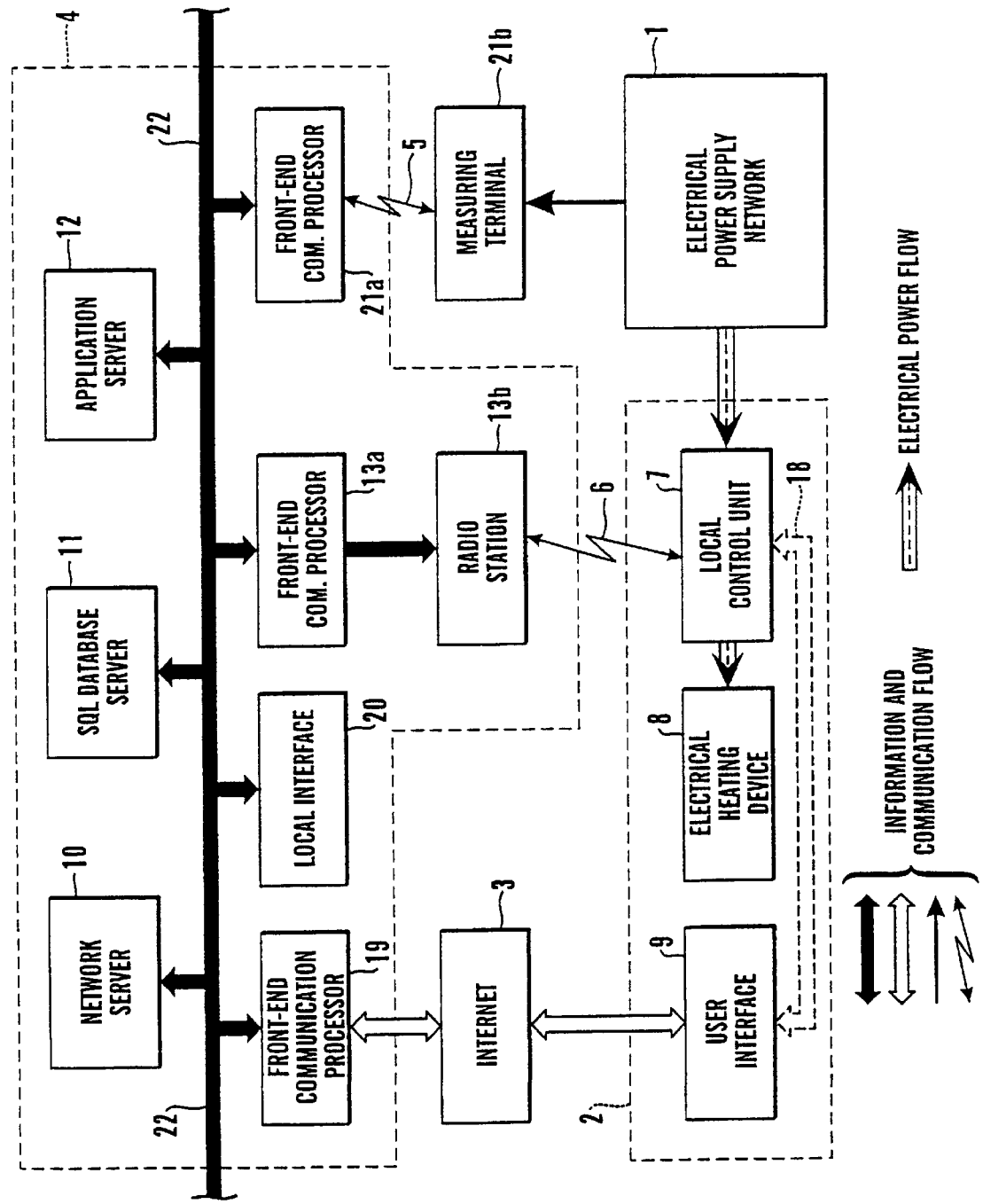
FIG. 2 illustrates a special design of the structures in FIG. 1.

FIG. 2 illustrates an application-oriented design of the control and communication structure which realises the present invention. As before the user interface comprises a local control unit 7 which is connected in series between the electrical power supply network 1 and one or more electrical heating devices 8 together with a user interface 9. The control centre 4 communicates with the user interface 9 via a data network 3 such as the Internet and comprises a network server 10, an SQL database server 11 and an application server 12, together with communication processors 13a, 19, 21a and possibly a local interface 20 for human/machine communication locally in the control system 4. The various servers and communication processors in the control system 4 are interconnected via a local network (LAN) 22. The network server 10 executes applications for communication via data network 3, for example via the Internet, via the front end communication processor 19. The database server 11 executes the application for an SQL-based database, while the application server 12 executes applications for the control, communication of control commands and transfer of messages, generates modified end user profiles as well as power profiles on the basis of information concerning operating and capacity conditions in the power supply network 1 and communicates with the end users 2 via the communication processor 13a and the radio station 13b. Information concerning the operating conditions in the electrical power supply network is obtained from the measuring terminal 21 and transferred via a fixed line connection 5, as described, to a front end communication processor 21a for receipt of measurement values from, e.g., local distribution networks. These measurement values which are generated via the measuring terminal 21b may quite simply be voltage measurements in the local distribution network, which supplies the end users 2. On the basis of measurements obtained via the measuring terminal 21b and the communication network 5, therefore, the control system 4 can monitor on aggregated level the operating conditions in the electrical power supply network and generate power profiles or modifications of the end user profiles via suitable applications. As already stated, the control system 4 is dedicated to the temperature and time control of the end users and will naturally be capable of serving a number of such end users 2 and a number of local distribution networks connected to the electrical power supply network 1. Since the control system 4 has been made largely application-oriented, employing already existing communication networks such as the Internet 3 or the mobile radio network 6 together with, for example, an application for the local network 22, in order to implement the method according to the present invention the control and communication structure will provide system solutions which are both efficient as well as cost-effective both on the communication and the software side.

Figure 3:
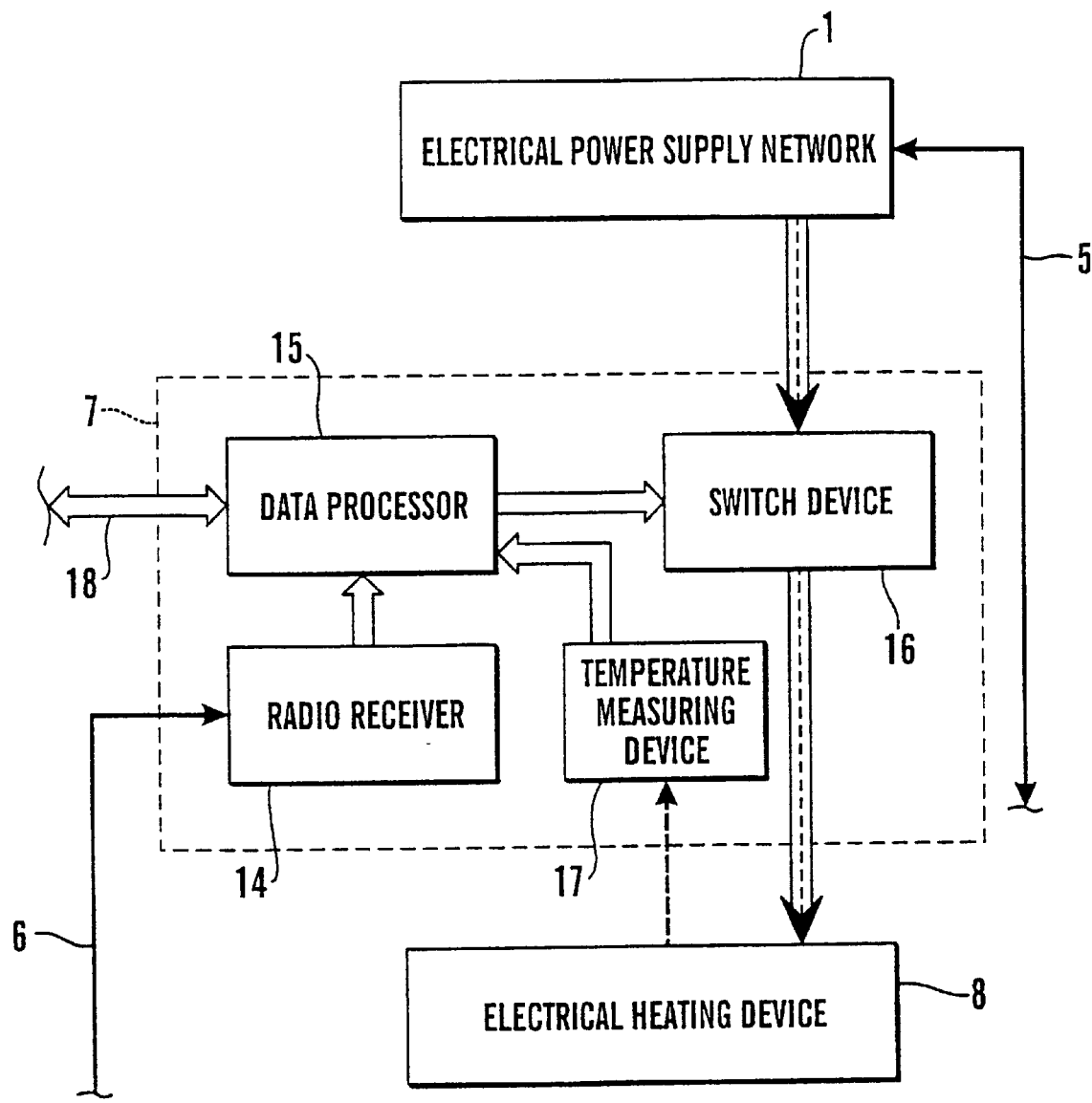
FIG. 3 illustrates the local control unit according to the present invention.

As already mentioned, radio communication from the radio station 13 to the local control unit 7 installed at the end user 2 can be performed via a standard generally available mobile radio system. The individual end user is given a telephone number for transfer of individual information and control commands to the individual local control unit 7, while a second telephone number is used for transmission in broadcast mode of messages which apply to several end users. The radio communication may, e.g., employ a standard calling technology such as that used in known mobile telephone networks. The local control unit 7 is illustrated in more detail in FIG. 3. It is preferably constructed from standard components. A radio receiver 14 is connected to the radio link 6 and receives messages from the control system 4. The control commands are transferred to a data processor 15 which is connected to a switch device 16. The local unit 7 is coupled in series via the switch device between the electrical power supply network 5 and an electrical heating device 9. It should be understood that the local unit can naturally serve a number of electrical heating devices 9. The electrical heating device 9 heats up a medium, such as the air in a room, the water in a container etc. and the temperatures are recorded by a temperature measuring device 17 which supplies the measurement result to the data processor 15. Within the limits which have been set in a user profile established by the end user and transferred to the control system 4, the data processor will now control the switch device 16 for time control of the electrical heating device 9 according to control commands transferred from the control and communication processor 12 in the control system 4. On the basis of the control commands a power control of the electrical heating device 9 can also be effected via the switch device 16, e.g. by including in the switch device 16 a triac which is pulsed on the basis of signals from the data processor 15. The local control unit 7 does not normally have its own energy source, the energy required being taken from the electrical power supply network 1. The data processor 15 may be connected to a display device (not shown) which indicates to the end user the current control and operating parameters. In order to find these parameters the control unit may also include a not shown recording device.

If the control system 4 finds that the end user's 2 wishes based on the transferred and stored user profile cannot be complied with due to, e.g., error conditions or capacity problems in the electrical power supply network, a message to this effect is transferred to the end users concerned via the radio link 6. In this case the control system 4 will normally control the heating device alone on the basis of the operating conditions in the power network, based, e.g., on a measured momentary power consumption or the voltage in the distribution network and a desired power profile. However, the message will also enable the end user to modify the user profile, with the result that the modified user profile replaces the original and is used for short, long or more closely specified periods. The end user also has the option of disconnecting the local control unit 7. For this purpose there is provided in the local control unit 7 or connected thereto a local control interface 18 which permits the end user to operate the local control unit 7 manually. The control interface 18 can also transfer data to the said, not shown display unit.

It will be seen that whether the control of the heating device 9 is performed manually and directly from the end user or overridden from the control system 4, the control unit will basically be able to act as an intelligent thermostat device for an electrical heating device.

The extent of the intelligence will be based on the information which is available for the control, and a flexible optimization of the operation both from the end user's and the power supply network's points of view can, of course, be obtained if the control is performed via the control system 4.

A more detailed account will now be given of the effect of different user profiles on the resulting power consumption as a result of central control of the heating device from the control centre.

Figure 4:
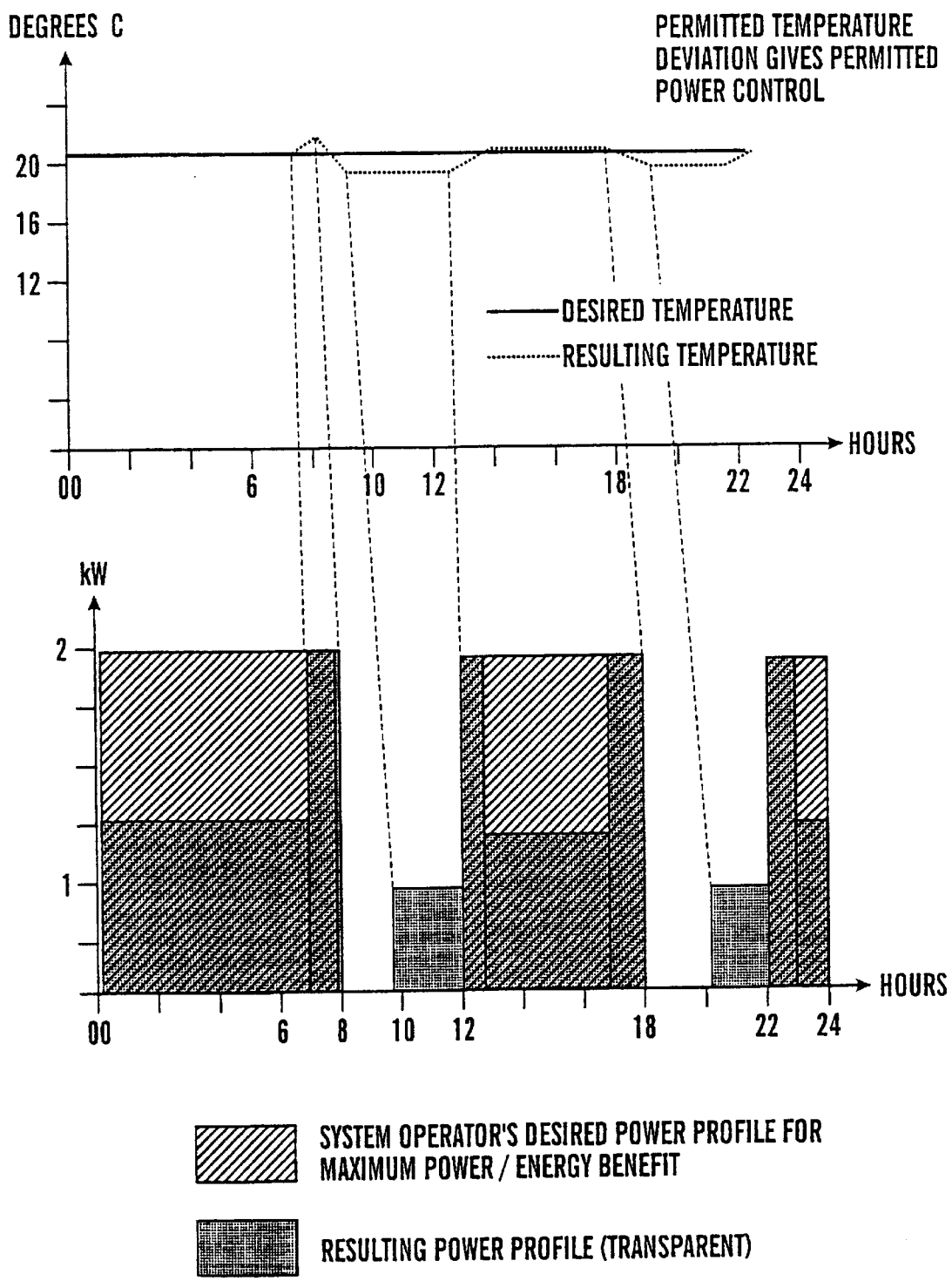
FIG. 4 shows the result of the method according to the present invention without a specific temperature profile.

At the top of FIG. 4 there is illustrated a user profile in which the temperature is given as constant, in the figure approximately 20.5° during a 24 hour period. On the basis of information on capacity and operating conditions in the network the control system or the system operator wishes a power profile which is illustrated in the hatched area at the bottom of the figure. It can be seen that between the hours of 8 and 12 and 18 and 22 the system operator or the control system prefers not to supply power to the end user. On the basis of the end user's wish for a constant temperature in the medium which has to be heated by the heating device, and the system operator's desired power profile, the resulting, optimum, desired control algorithm gives a power profile which is illustrated at the bottom of FIG. 4, shaded and overlaid the desired power profile. This gives a temperature variation which is indicated by a broken line at the top of FIG. 4, and it will be seen that the temperature deviation from the desired temperature of approximately 20.5° C. is insignificant, but with a substantial reduction in power consumption.

Figure 5:
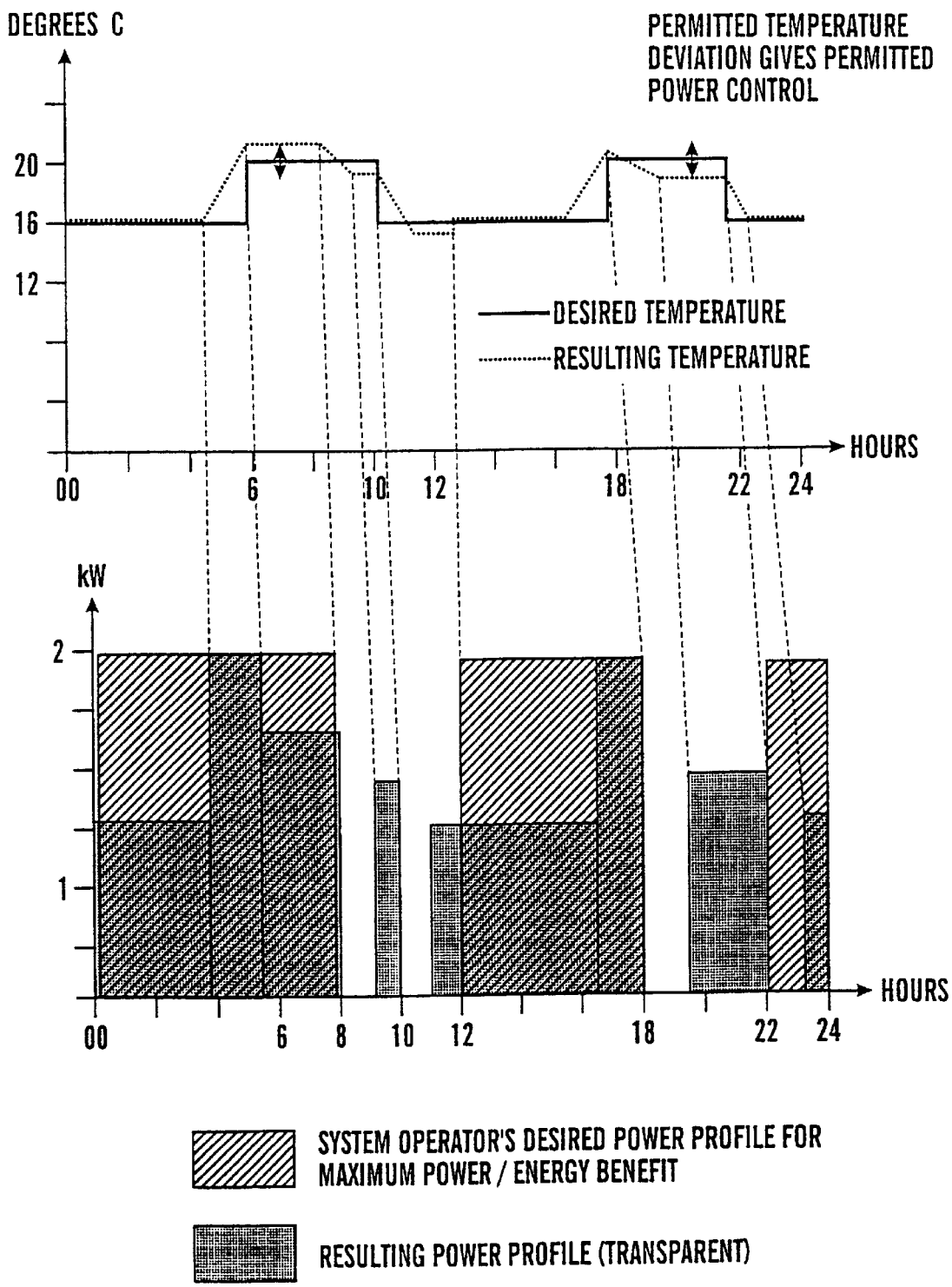
FIG. 5 shows the result of the method for a user profile which specifies a low temperature variation.

FIG. 5 illustrates a user profile with a desired temperature profile which at intervals can deviate substantially from a desired maximum temperature. The maximum desired temperature of approximately 20.5° C. is, as illustrated at the top of FIG. 5, between, e.g., the hours of 6 and 10 and between 18 and 22. In the intermediate period the end user permits the temperature to be reduced to 16° C. When this user profile is compared with the system operator's desired power profile, the control algorithm gives the optimized, resulting power profile which is illustrated in the shaded area at the bottom of FIG. 4 and overlaid the hatched desired power profile. The resulting temperature variation for the end user is indicated at the top of FIG. 5 by the broken line. It can be seen that only for very short periods does the temperature deviation lie more than 1° outside that which was stipulated in the user profile.

Figure 6:
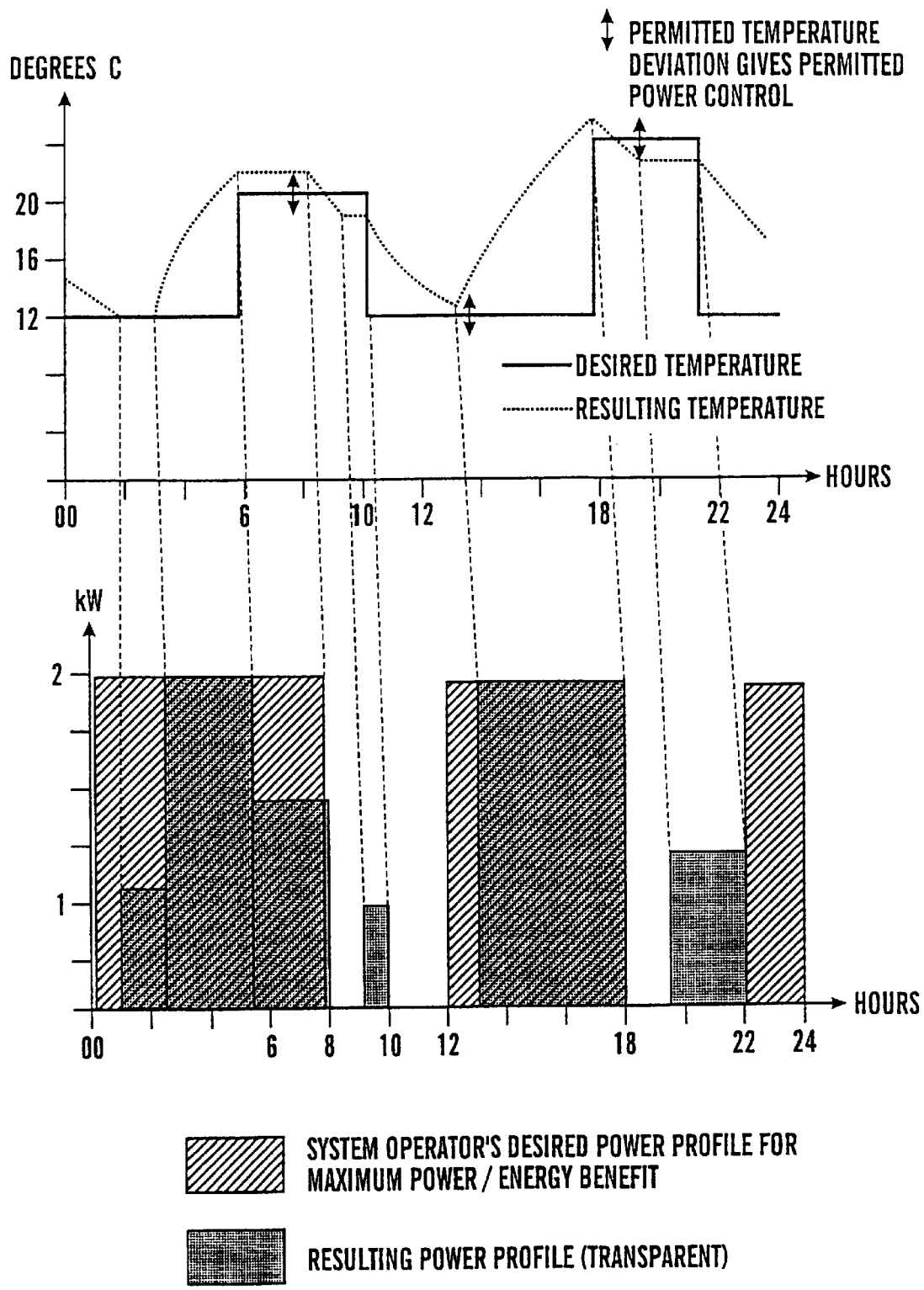
FIG. 6 shows the result of the method according to the invention with a user profile which specifies a large temperature variation.

FIG. 6 illustrates the control of a local heating device when the temperature deviations from a desired maximum temperature or mean temperature can be substantial during some periods. During the period from midnight until 6 o'clock, therefore, the user profile permits a temperature of only 12° C. which is required to be raised to 20.5° C. during the period from 6 until 10 and then to be again reduced between 10 and 18 to 12°, and subsequently raised to approximately 24° C. during the period 18 until 22 hours, and then to be reduced to 12° from 22 hours until midnight. The resulting optimum power profile which results from the control algorithm used which takes into consideration both the user profile and the system operator's desired power profile is illustrated in the shaded area at the bottom of FIG. 5 and overlaid the hatched, desired power profile. It will be seen that the optimum power profile very closely approximates to the desired maximum values for the temperature profile during the period concerned. On the other hand the deviations from the minimum temperature are greater, since it is difficult to achieve a completely accurate adaptation due to the great temperature deviation and the thermal hysteresis inherent in the heated medium. In other words the medium will slowly lose heat after the power has been switched off and from a minimum temperature for heating to maximum temperature a time will be required which is dependent on the temperature differential in the temperature profile. On the other hand it will be possible to exploit the heat hysteresis in the medium which has to be heated by performing the power control before the period when the maximum temperature is desired and where the system operator primarily does not wish to supply any power, with the result that the medium which has to be heated has a temperature which lies slightly above the desired maximum temperature. By means of a short application of a relatively modest amount of power and consequently a low amount of energy some way into the interval during which maximum temperature is required, the temperature profile is still kept within the user profile's desired value by approximately 1°. This implies that even with relatively large temperature deviations, where the deviation between real temperature and desired temperature in periods outside those where the maximum temperature is desired, it is possible to obtain an optimum power profile which takes account of the capacity and operating conditions in the energy supply network, but which at the same time gives the end user the desired maximum temperature during the periods concerned.

There is naturally no reason why the user profiles should not include other regulating values than time and temperature level. Energy and power levels and time interval may, e.g., be indicated for regulating power, and tariffs may be specified. It should be understood that information on power consumption in the distribution network is obtained via the communication network 5 and may be based on measurements in local distribution networks. These power measurements can be entered in the database 11 and used in the control system's control processor 12 in order to modify the control algorithms if a voltage level is recorded in the distribution network which results in the control system being unable to comply with the desired values stipulated in the user profiles. A voltage drop in the distribution network is just such a situation which indicates operating conditions where the consumption exceeds the capacity and will call for, e.g., a modification of user profiles or a message to the end user that the user profile's criteria for temperature and power levels cannot be observed, with the result that the control, for example, must now be performed on the basis of a power profile alone. However, as already mentioned, in this case other options are open.

A person skilled in the art will realise that within the scope of the method and the control and communication structure according to the present invention, communication, transfer of control commands and generation of user profiles and control algorithms can be performed on the basis of a number of criteria whose main purpose in the final analysis can provide an optimization of the electrical energy consumption with regard to both end user requirements and the power supplier's situation. Since user profiles and control algorithms simultaneously take account of prices and tariffs, a market adaptation can also be achieved, as well as a cost optimization for electricity consumption. The method and the system according to the present invention are therefore particularly well suited in a deregulated energy market, where supply and demand control the market prices.

A further advantage of the method and the control and communication structure according to the present invention is that it can make use of existing radio communication networks which may either be regional or national for transfer of control commands which are common to several end users in a broadcast mode. For normal operation the method and the control system are based on a fixed, stored user profile and generation of control algorithms, and by transferring control commands from the control system the communication will substantially be one-way without the use of any continuous monitoring and control of the end user in special communication set-ups. At the same time the power supply system's capacity and operating conditions are integrated with the end users' consumption pattern, and a further favourable effect is obtained by the fact that the method and control and communication structure according to the present invention can exploit functions which are already available in the data and communication systems employed, as well as employing application-oriented system solutions.

What is claimed is:

1. A method for temperature and time control of electrically-operated heating devices installed at an end user in order to optimize energy consumption and energy costs, wherein the end user is connected to a power supply network wherein for the control there is employed a dedicated control system which forms part of a control and communication structure, wherein a local control unit is connected to at least one electrical heating device, and arranged to control the operation of one or more electrical heating devices, comprising the steps of:

formulating a desired user profile for the heating device, wherein the user profile comprises at least a desired temperature variation with indication of a maximum permissible deviation from the desired temperature variation within specified periods;

transferring the desired user profile from the end user to the control system via a first communication network;

storing the desired user profile in a data base provided in the control system;

modifying the desired user profile in the database on the basis of information concerning the operating conditions in the power supply network received in the control system via a second communication network, thus obtaining a modified user profile which takes into consideration the operating conditions in the power supply network, including total consumption, capacity and detected error conditions, wherein the modified user profile should at all times lie within limits which are given by the deviations in the temperature variation indicated in the desired user profile during specified periods;

transferring control commands from the control system to the local control unit installed at the end user via a third communication network; and continuously modifying the control commands in the control system on the basis of the modified user profile, thus primarily optimizing the operation of the heating device primarily on the basis of the desired user profile and secondarily on the basis of the operating conditions in the power supply network.

2. A method according to claim 1, wherein if the primary optimization cannot be implemented due to existing operating conditions in the power supply network, the control system issues a message to the end user via one of the communication networks indicating to the end user options for the control of the heating device, with the result that in a first option the control is performed solely on the basis of a power profile based on the operating conditions in the power supply network and in a second option on the basis of a temporary change in the desired user profile, the end user being able to select an option for the continued control of the operation of the heating device or alternatively to cancel the control system's control.

3. A method according to claim 2, wherein when the operating conditions in the power supply network again permit the primary optimization to be implemented, the control system causes a new message to be sent to the end user via one of the communication networks and if the control system is still in control automatically returns to the original, desired user profile.

4. A method according to claim 1, wherein the desired user profile further specifies for specified periods desired values for one or more of the following parameters: energy consumption level, the periods during which the control of the heating device should take place, together with energy cost level, the energy cost level being assigned to the tariff(s) on offer during the respective periods concerned.

5. A method according to claim 1, wherein the first communication network is a generally available data network for two-way communication between the end user and the control system.

6. A method according to claim 1, wherein the third communication network is a radio link network used for one-way communication from the control system to the end user.

7. A method according to claim 5, wherein the communication from the control system to the end user via the radio link network is received by a communication receiver provided in the control unit.

8. A method according to claim 6, wherein the communication from the control system to the end user via the radio link network is performed in a first mode for transfer of control commands to the individual end user and in a second mode for transfer of control commands which are common to several end users or a group of end users.

9. A method according to claim 8, wherein the communication on the radio link network employs a known calling system, the end user being assigned a first calling address for receipt of control commands transferred in the first mode and a second calling address for receipt of control commands or messages which are transferred in the second mode.

10. A method according to claim 1, wherein a data processing device is provided in the control system for calculating control algorithms for generation of control commands on the basis of the desired user profile and taking into account the modification thereof on the basis of a monitoring in the control system of the power supply system and the operating conditions therein on an aggregated level, user profiles and the information which is processed and generated by the data processing device being stored in the database and the communication between control system and end user being performed via known interfaces assigned to the data processing device for each of the communication networks.

11. A control and communication structure for temperature and time control of electrically-operated heating devices installed at an end user to optimize energy consumption and energy costs, wherein the end user is connected to a power supply network, and wherein the control and communication structure comprises a dedicate control system and one or more communication interfaces, wherein there is installed at the end user a local control unit connected with at least one electronic heating device and arranged to control the operation of one or more heating devices, wherein the local control unit comprises a communication interface for receipt of control commands and messages which are transmitted from the control system to the control unit, wherein the local control unit is arranged in the same room, area or environment whose temperature is to be influenced by the heating device, wherein there is installed at the end user a user interface for two-way communication between the end user and the control system, wherein in the control system there is provided a data processing device which is assigned respectively to a first interface for one-way communication with the communication interface in the control unit, a second interface for two-way communication between the control system and the user interface and a third interface for receipt of information concerning the operating conditions in the power supply network, and wherein the control system comprises a database which stores a desired user profile transferred from the end user to the control system, or modifications thereof performed by the data processing device, together with control commands and messages which have to be transferred to the control unit or the end user.

12. A control and communication structure according to claims 11, wherein the local control unit's communication interface is composed of a radio communication device, that the local control unit further comprises a data processor connected to the radio communication device, at least one switch device which is connected to the data processor and can be influenced thereby to connect electrical energy to the heating device, and at least one temperature measuring unit connected to the data processor and arranged to measure the temperature in a medium which is to be influenced by the heating device, the local control unit being arranged to be coupled in series in the electric circuit between the heating device and the power supply network.

13. A control and communication structure according to claim 12, wherein the radio communication device is a radio receiver.

14. A control and communication structure according to claim 12, wherein the local control unit comprises a device for recording and displaying the energy consumption.

15. A control and communication structure according to claim 12, wherein the local control unit comprises a device for display of the control and operating parameters.

16. A control and communication structure according to claim 11, further comprising a local control interface connected with the control unit and via which the end user can monitor the operation of the heating device and cancel the control from the control system and enter control commands.

17. A control and communication structure according to claim 11, further comprising a local control interface in the control unit at the disposal of the end user for manual operation of the control unit.

* * * * *